United States Patent [19]

Strybel

[11] 3,829,077

[45] Aug. 13, 1974

[54] ADJUSTABLE CLAMPING MEANS

[75] Inventor: Richard V. Strybel, Elk Grove Village, Ill.

[73] Assignee: Imperial-Eastman Corporation, Chicago, Ill.

[22] Filed: Mar. 27, 1972

[21] Appl. No.: 238,256

[52] U.S. Cl. ................. 269/107, 269/224, 269/246, 279/112, 269/287

[51] Int. Cl. ......... B25b 1/02, B25b 1/12, B25b 1/24

[58] Field of Search ........... 269/107, 153, 156, 218, 269/264, 287; 279/110, 112

[56] References Cited

UNITED STATES PATENTS

| | | | |
|---|---|---|---|
| 1,173,316 | 2/1916 | Segal | 64/29 |
| 1,586,139 | 5/1926 | Bivins | 269/156 X |
| 2,695,649 | 11/1954 | Tilden | 269/321 ME |
| 3,113,508 | 12/1963 | Trachtman | 269/107 X |
| 3,633,900 | 1/1972 | Olson | 269/156 |

*Primary Examiner*—Roy Lake
*Assistant Examiner*—Neil Abrams
*Attorney, Agent, or Firm*—Hofgren, Wegner, Allen, Stellman & McCord

[57] ABSTRACT

An adjustable clamping means for use in clamping any one of a plurality of objects having different cross-sectional sizes and/or shapes. The clamp may be used for holding a tube such as in a tube flaring tool. The clamping portions of the clamp provide a positive retention of the workpiece while yet effectively precluding deformation of the workpiece as by overstressing thereof in effectively holding the workpiece. The clamp includes interleaved, intersliding portions cooperatively defining an array of clamping surfaces adjustably spaced from the axis of an inner clamping space in which the workpiece is retained. Manual means are provided for adjusting the clamping surface array so that the tool may be used with different diameter cylindrical, polygonal, irregular, etc., workpieces. The clamp may include means for preventing overtorqueing thereof illustratively in the form of a spring biased clutch. The manual operating means may alternatively be separable from the clamping elements or connected thereto as desired. In one form, the clamp comprises a chuck for use in holding a workpiece such as in a lathe or the like, in a centered relationship to an axis of the clamp.

57 Claims, 25 Drawing Figures

46 8 48 31 30 29 47 50 53 7 40 40 7 48 49 33 28 35 39 46 8 34

12
20
19
10
31
29
28
13
24
30
33
32
17
20
19

16
15

14
18
20
32
4
22
25
10
24
28
5.
30
5.
21
13
19
20
32
4
25
23
19
11

47
46
22
35
35'
35
35'
21
46
23

33
29
30
22
34
34'
34
34'
48
21
48
23
33

8.
46
48
31
30
24
47
50
53
7.
40
40
7.
49
33
28
48
35
39
46
34
8.

31
30
24
28
53
40
40
47

47
45
44
49
50
30
24
25
26
22
51
27
52
50
28
25
26
23

35
40
42
45
43
22
43'
35'
45'
21
36'
40
23

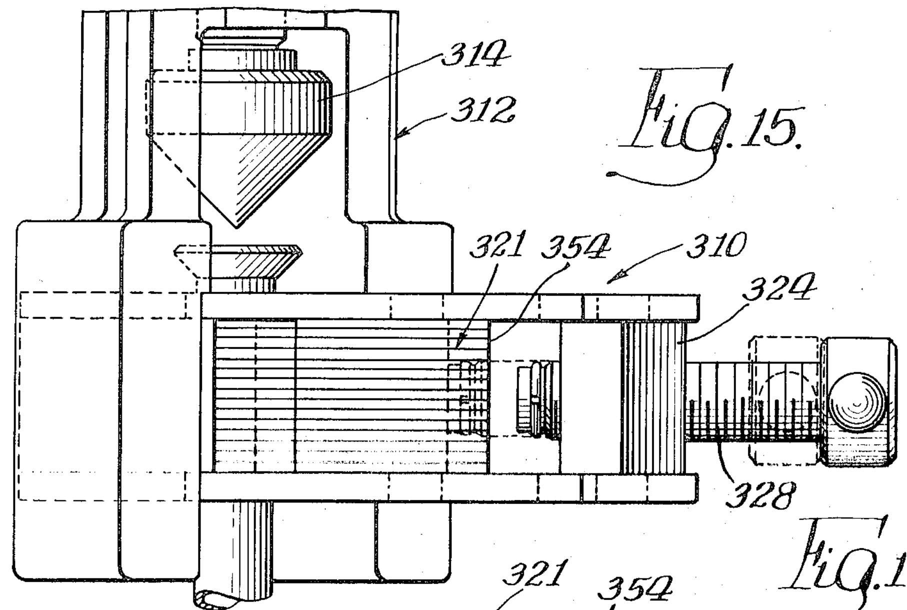
Fig. 15.
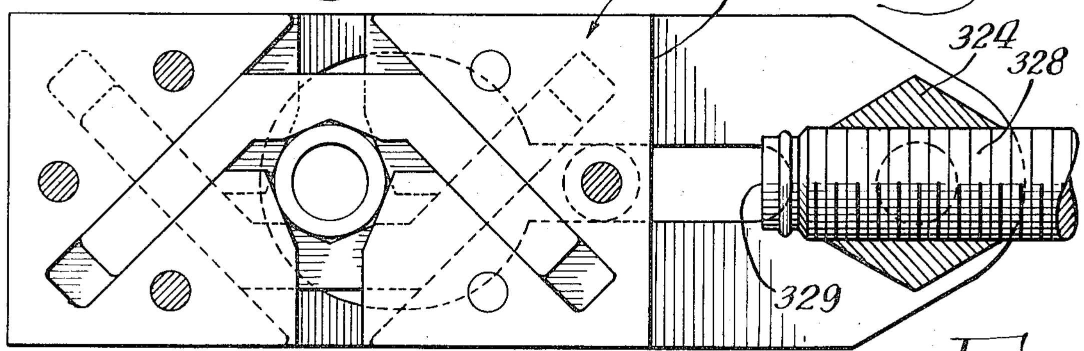
Fig. 16.
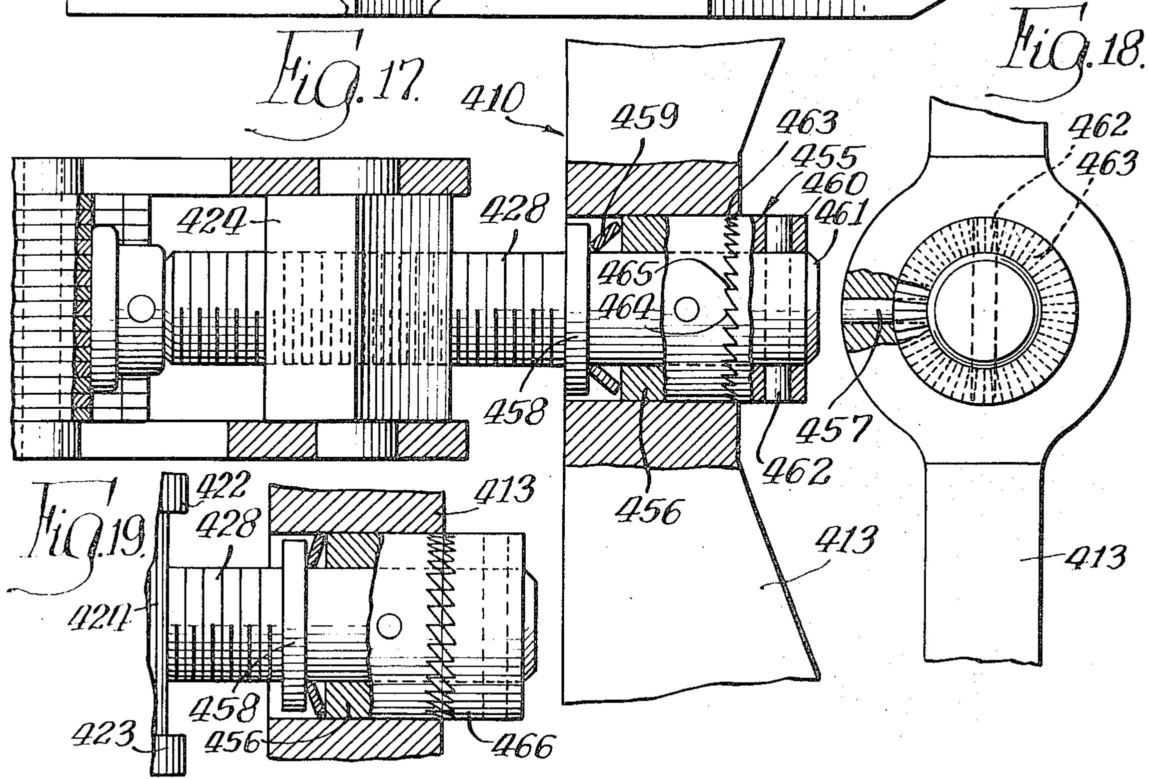
Fig. 17.
Fig. 18.
Fig. 19.

22.
23.
510
566
567
568
569
570
571
572
573
574
575
576
577
578
579
580
581
582
583
584
585
586
586'
587
587'
588
588'
589
590
591
592
593
594
595
596
597
598
599
600

ADJUSTABLE CLAMPING MEANS

BACKGROUND OF THE INVENTION

1. Field of the Invention

This invention relates to adjustable clamping means and in particular to clamping means for clamping workpieces in association with tools for performing work on the workpieces.

2. Description of the Prior Art

A number of devices have been developed using interleaved clamping elements. For example, in Melchor Centant V. U.S. Letters Pat. No. 1,666,844, a nail straightener is illustrated having interleaved gripping elements which would engage the nail at spaced intervals. Melchor's tool engages two surfaces with each successive gripping element. U.S. Letters Pat. No. 2,711,773 to Wilson shows a tube flaring tool wherein the clamping elements are formed of laminations as an integral body with suitable tube receiving recesses of conventional shape. U.S. Letters Pat. No. 631,013 of Jackson shows a vise having a stepped structure providing a multiple contact engagement of the gripping element with the tube surface. The U.S. Letters Pat. Nos. 2,373,946 of Capewell and 3,109,479 of Wolcott show similar conventional tube gripping recesses.

Franck U.S. Pat. No. 3,027,931, owned by the assignee hereof, shows a tube flaring tool clamping bar assembly utilizing different size openings to accommodate different size tubes.

SUMMARY OF THE INVENTION

The present invention comprehends an improved adjustable clamp for use such as in a tube flaring tool for clamping any one of a plurality of objects, or workpieces, having different cross sections. Illustratively, the clamp may be used in a tube flaring tool wherein different diameter tubes are to be clamped for flaring of the cut end thereof. Alternatively, the clamp may comprise a chuck means wherein the workpiece is centered relative to the central axis of the chuck notwithstanding a variation in the cross-sectional size or diameter thereof.

More specifically, the present invention comprehends an improved adjustable clamp including means defining a pair of first and second clamping surfaces, means defining a third clamping surface, and means for variably positioning the clamping surfaces means to dispose the clamping surfaces in any one of a plurality of polygonal arrays about a clamping space, including means for adjustably associating said first and second surfaces means to have variable spacing along a line of movement, and the third surface means to have variable positioning laterally of the line of movement, and means responsive to a variable positioning of one of the clamping surface means for correspondingly adjustably positioning at least one other clamping surface means to maintain the clamping surfaces in polygonal array notwithstanding a variation in the cross section size thereof whereby the clamping surfaces may engage and retain an object in the clamping space.

Further more specifically, the invention comprehends an adjustable clamp for clamping any one of a plurality of objects having different cross sections including a first slide member having a first, substantially rectilinear slot, a second slide member having a second, substantially rectilinear slot substantially coplanar with the first slot, a third slide member having a first slide portion slidably received in the first slot, a second slide portion slidably received in the second slot, and a clamping portion between the slide portions, means for mounting the first and second members for variable spacing therebetween along a preselected line of movement with the slots extending toward each other at equal and opposite acute angles to the line of movement, the clamping portion of the third slide member being variably positioned in a direction perpendicular to the line of movement as a result of the variable spacing of the first and second slide members, the first and second slide members further defining clamping surfaces adjacent the third slide member clamping portion and defining therewith an adjustable size polygonal array of clamping surfaces facing inwardly toward a clamping space in which the object to be clamped is received for peripheral clamping engagement by the clamping surfaces, and means for forcibly effecting relative movement of the first and second slide members toward each other along the line of movement.

The adjustable clamp may comprise an adjustable gripping device including a first gripping means providing a polygonal array of substantially planar first gripping surfaces disposed about a centerline, a second gripping means providing a similar polygonal array of substantially planar second gripping surfaces disposed about the centerline coaxially adjacent the first array but offset from the first array 180° about the centerline toward the centerline whereby a cylindrical object coaxial to the centerline within the arrays is engaged concurrently by the first and second gripping means at a number of positions about the centerline equal to the number of sides of the polygonal array.

The clamp may include means for limiting the force exertable by the means for effecting relative movement of the slide member for limiting the force of engagement thereof against the object to be clamped.

Still further, the invention comprehends the provision of such an adjustable clamp defining an adjustable chuck including means defining a first pair of clamping surfaces, means defining a second pair of clamping surfaces, means for variably spacing the first clamping surfaces means, and means responsive to a variable spacing of the first clamping surfaces means for correspondingly variably spacing said second clamping surfaces to maintain the surfaces in a polygonal array about a clamping space whereby the surfaces may engage and retain an object in the space.

Further more specifically, the adjustable chuck clamp may comprise a first slide member having a first, substantially rectilinear slot and a second, substantially rectilinear slot extending angularly to the first slot, a second slide member having a third, substantially rectilinear slot substantially coplanar with the first slot and a fourth, substantially rectilinear slot substantially coplanar with the second slot, a third slide member having a first slide portion slidably received in the first slot, a second slide portion slidably received in the third slot, and a clamping portion between the first and second slide portions, a fourth slide member having a third slide portion slidably received in the second slot of the first slide member, a fourth slide portion slidably received in the fourth slot of the second slide member, and a clamping portion between the third and fourth slide portions, means for mounting the first and second members for variable spacing therebetween along a preselected line of movement with the slots extending toward each other at equal and opposite acute angles to the line of movement, the clamping portion of the third slide member being variably positionable in a direction perpendicular to the line of movement, the first and second slide members further defining clamping surfaces adjacent the third slide member clamping portion and defining therewith a peripheral polygonal array of clamping surfaces facing inwardly toward a clamping space in which the object to be clamped is received for peripheral clamping engagement by the clamping surfaces, the fourth slide member being variably positioned in a direction perpendicular to the line of movement by the first and second slide members as a result of the variable spacing thereof, the fourth slide member clamping portion facing inwardly toward the clamping space for engaging the object, and adjustable means for forcibly effecting movement of the third slide member to move the first and second slide members toward each other along the line of movement for engaging the object to be clamped therebetween, whereby the array of clamping surfaces is adjustable in cross section and concentric with the center of the space.

The clamping surface array may be discontinuous in that the clamping surfaces may be spaced from each other. The polyhedral array may be square, hexagonal, octangular, etc., in cross section, it having been found that an octangular cross section array is advantageous in permitting forceful gripping of a thin walled object such as a tube, while yet effectively avoiding deformation of the tube.

The means for limiting the force exertable by the clamping means on the workpiece may comprise a spring biased clutch which may include a unidirectional ratcheting structure for positive withdrawal of the force applying means while effectively limiting the maximum force applied thereby.

The force applying means may be separably associated with the slide members or may be connected thereto as desired. In the connected arrangement, the slide members are automatically spaced apart as a result of the release of the clamping pressure for facilitated removal and replacement of objects to be clamped.

The clamp is adapted for use as the clamp means of a tube flaring tool, and by virtue of the universal adjustable clamping action provided thereby, only a single clamping surface means need be provided obviating the need for relatively bulky, unwieldy elongated clamp bar means conventionally used in the prior art. Further, the adjustability of the clamping means permits the clamp to accommodate not only a wide range of conventional tubes and the like presently accommodated by the known tools, but also permits universal use with both metric and English size tubes, bolts, etc. Thus, the tool is adapted for future use upon metrication of the U.S. standards while being presently adapted for use with the present English system sized workpieces, without requiring any modification thereto.

In the chuck form of the invention, the clamping surfaces are interassociated so as to be maintained centered on a single center axis of the chuck clamp. In the illustrated chuck arrangement, the clamping surfaces define a hexagonal cross-sectional polyhedral array with the adjustment of the clamping surfaces in spaced relationship to the center axis of the chuck being effected automatically by the adjustment of one clamping surface member with the other clamping surface members being guided by suitable means into variably spaced relationship to the axis.

The means for applying the clamping force may comprise a manually operable means.

BRIEF DESCRIPTION OF THE DRAWING

Other features and advantages of the invention will be apparent from the following description taken in connection with the accompanying drawing wherein:

FIG. 15 is a fragmentary side elevation of a flaring tool using a modified form of adjustable clamp embodying the invention wherein the force transmitting member is separable from the clamping elements;

FIG. 16 is an enlarged fragmentary top plan view of the adjustable clamp of FIG. 15;

FIG. 17 is a fragmentary enlarged longitudinal section of a further modified form of adjustable clamp embodying the invention having a force limiting means incorporated therein;

FIG. 18 is a fragmentary end view thereof;

FIG. 19 is a fragmentary section illustrating the arrangement thereof upon reaching the maximum force wherein the handle is effectively disconnected from the force transmitting means;

DESCRIPTION OF THE PREFERRED EMBODIMENTS

Figure 1:
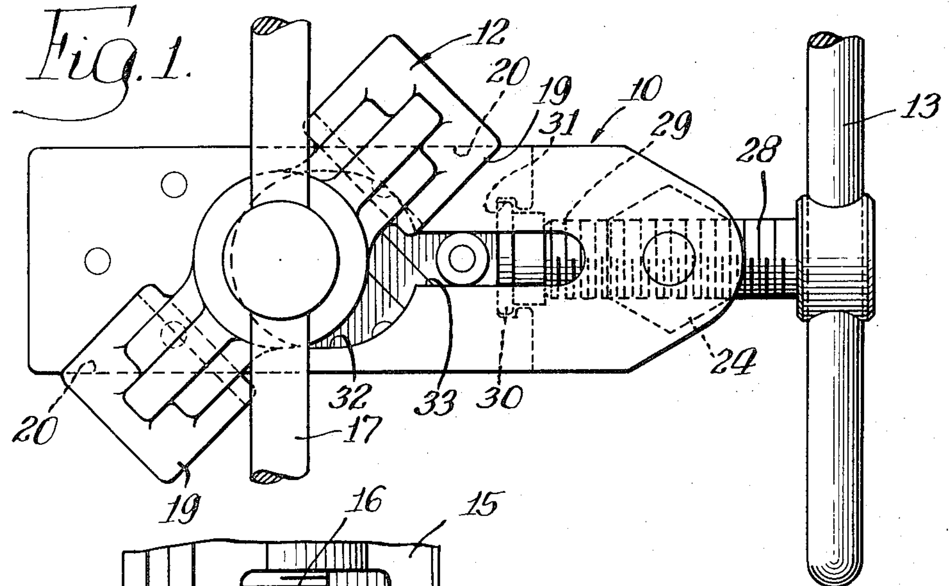
FIG. 1 is a top plan view of a flaring tool utilizing an adjustable clamp embodying the invention.

In the exemplary embodiment of the invention as disclosed in FIGS. 1–9 and 12 of the drawing, an adjustable clamp generally designated 10 is shown to comprise a clamping means for holding an object, or workpiece, 11 in association with means such as a flaring tool 12. The clamp 10 is adapted to hold any one of a plurality of different size workpieces in operable association with the tool and comprises a manually adjustable clamp having a handle 13 for effecting adjustment of the clamp as desired by the user. In illustrating the invention, the clamp is shown for use with a flaring tool, it being obvious to those skilled in the art that the clamp may be used for any suitable purpose where it is desirable to hold an object.

Figure 2:
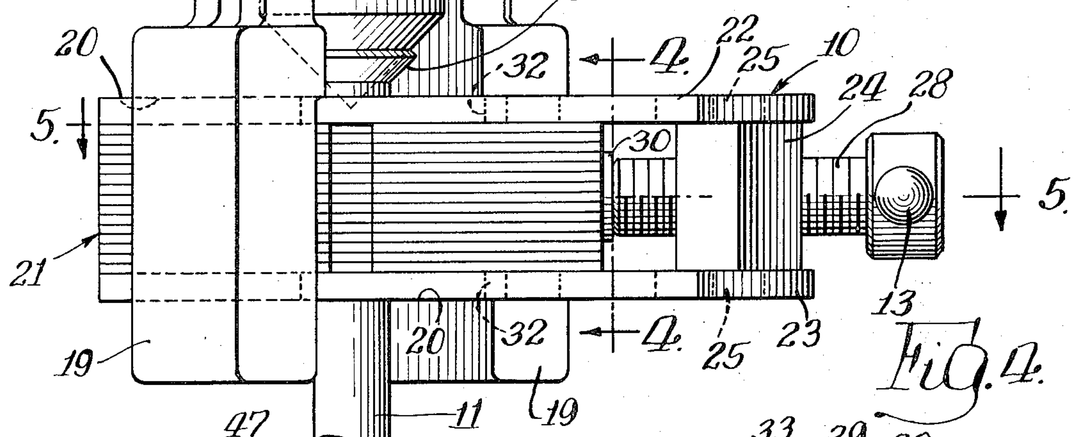
FIG. 2 is a fragmentary side elevation thereof.
Figure 3:
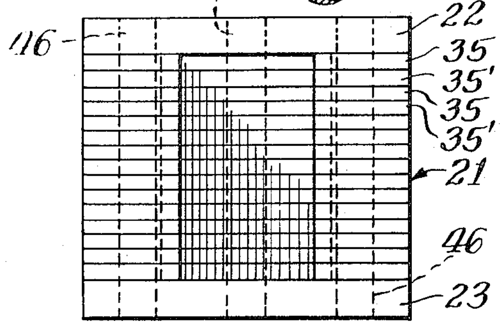
FIG. 3 is an end elevation thereof looking from the left end of FIG. 2.
Figure 4:
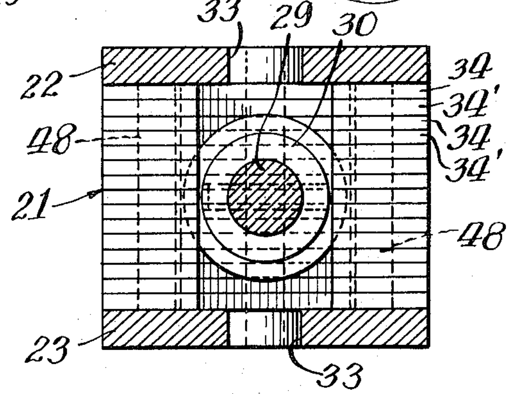
FIG. 4 is a transverse section taken substantially along the line 4—4 of FIG. 2.

In being adapted for use with the flaring tool 12, the adjustable clamp is arranged to hold a tube coaxially of a flaring cone 14 which is movably mounted to a yoke 15 by means of a threaded shaft 16. The shaft is manually rotatable by means of a handle 17 to selectively advance or retract the flaring cone relative to the end 18 of the tube extending upwardly from the clamp 10, as shown in FIG. 2. The lower portion of the yoke 15 defines a pair of legs 19 having suitable slots 20 for movably receiving the clamp to center the tube end 18 coaxially of the flaring cone. As shown in FIG. 1, the slots 20 are arranged at an angle to the centerline between the legs 19 to facilitate the introduction and removal of the clamp and tube relative to the flaring tool. One excellent example of such a flaring tool utilizing prior art tube clamping means is shown in Franck U.S. Pat. No. 3,027,931, owned by the assignee hereof, to which patent reference may be made for a detailed disclosure of the flaring tool structure other than the tube holding clamp means.

The clamp 10 comprises a plurality of interfitted slide members generally designated 21 retained between a top plate 22 and a bottom plate 23. A block 24 extends between the top plate 22 and bottom plate 23 at one end thereof and includes reduced projecting end portions 25 received in openings 26 in the top plate 22 and bottom plate 23, respectively. The end portions 25 may be peened to lock the block to the plates. The block further defines a through threaded bore 27 through which is threaded a threaded rod 28 carrying at its outer end the handle 13. The inner end 29 of the rod rotatably carries a connector 30 received in an undercut slot 31 of the interfitted slide members 21. Each of top plate 22 and bottom plate 23 defines a relatively large through opening 32 and a slot 33 extending centrally of the plate away from opening 32 toward block 24.

Figure 5:
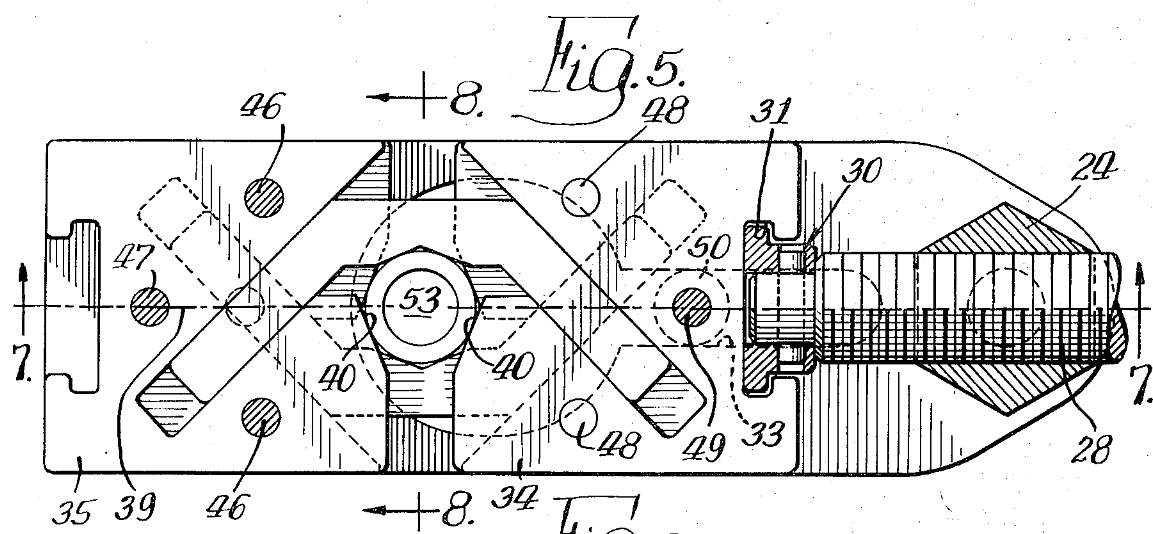
FIG. 5 is a longitudinal section taken substantially along the line 5—5 of FIG. 2.
Figure 6:
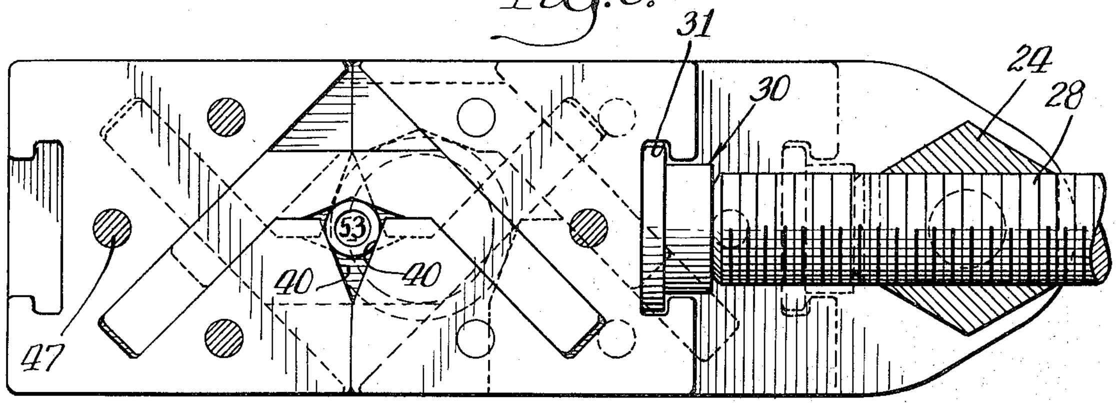
FIG. 6 is a longitudinal section similar to that of FIG. 5 but showing the tool as arranged for use with a tube having a diameter substantially smaller than that of the tube illustrated in FIG. 5.
Figures 9, 10, 11, 12, 13, 14:
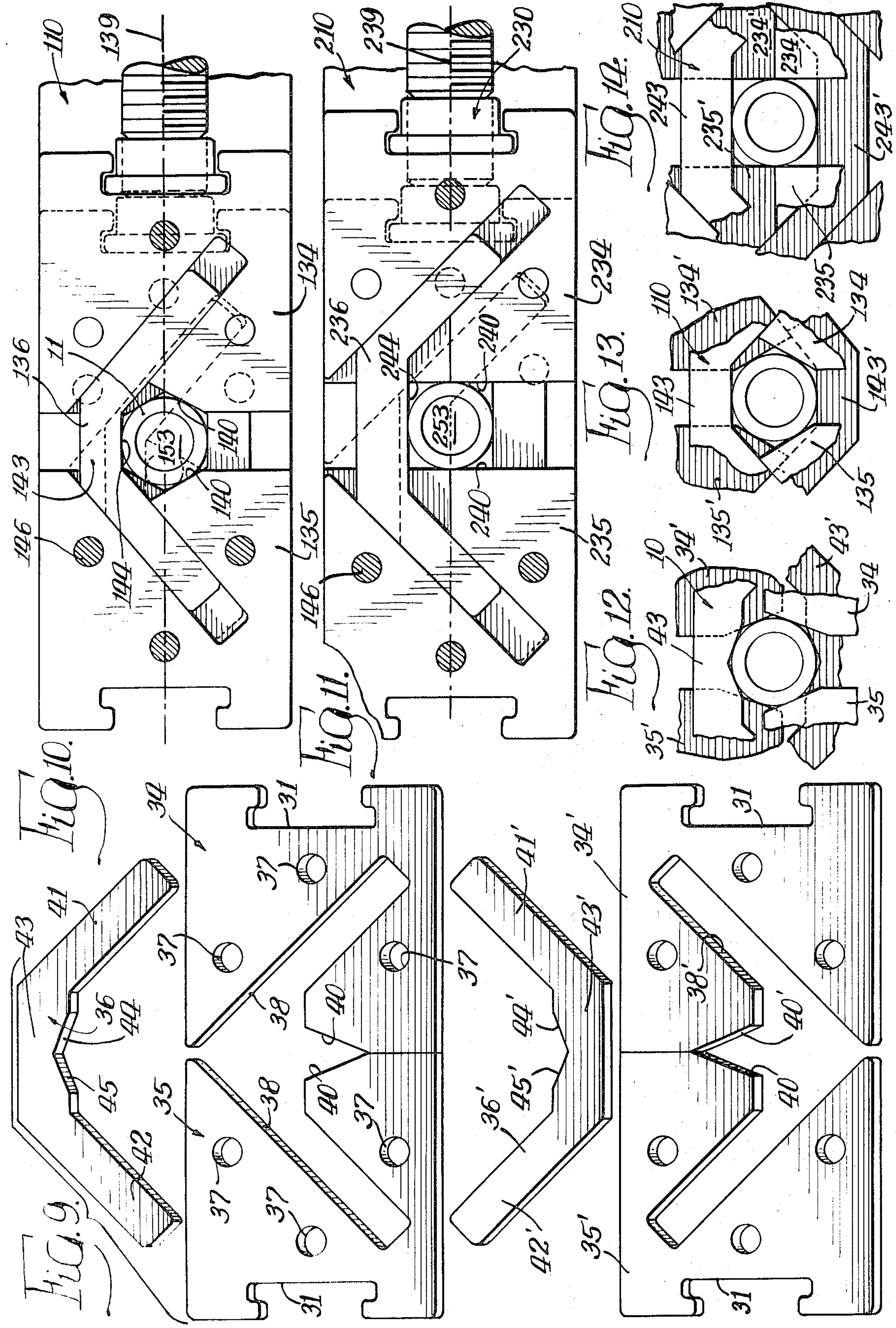
FIG. 9 is an exploded perspective view of two sets of vertically adjacent slide members thereof.
FIG. 10 is a fragmentary longitudinal section similar to that of FIG. 5 but showing a modified form of clamping surface means providing a different polygonal clamping surface array from that of the clamping surface means of FIG. 5.
FIG. 11 is a fragmentary view similar to that of FIG. 10 showing a further modified form of clamping surface means providing a further different polygonal clamping surface array from that of the clamping surface means of FIG. 5.
FIG. 12 is a fragmentary view illustrating portions of the overlying adjacent sets of slide elements defining an octangular cross section array.
FIG. 13 is a fragmentary view illustrating portions of the overlying adjacent sets of slide elements defining a hexagonal cross section array.
FIG. 14 is a fragmentary view illustrating portions of the overlying adjacent sets of slide elements defining a square cross section array.

The interfitted slide members 21 comprise a plurality of layers of first slide members 34, second slide members 35, and third slide members 36. The succeeding layers of associated slide members 34, 35 and 36, are reversed, as shown in FIG. 9, wherein a first set of slide members 34, 35, and 36 is shown in combination with an adjacent set of slide members identified as slide members 34', 35', and 36', it being understood that the respective slide members are identical in the two layers except for the reversal in the positioning thereof. Each of the first and second slide members defines the undercut slot 31 at one end thereof and is provided with three through holes 37. Each of the first and second slide members is further provided with a substantially rectilinear slot 38 which extends at an angle to the longitudinal axis 39 of the clamp, and more specifically, to the slot 33 which, as will be brought out more fully herefollowing, defines a line of movement of the slide members 34. In the illustrated embodiment, the respective slots 38 extend at opposite 45° angles to this longitudinal axis line of movement. The confronting portions of the paired first and second slide members define clamping surfaces 40 which, in clamp 10, extend at an angle of approximately 67–½° to the longitudinal line of movement. Thus, as shown in FIGS. 5 and 6, the clamping surfaces 40 comprise two portions of an octangular array.

Third slide member 36 comprises a slide bar having opposed legs 41 and 42 extending outwardly at an angle of 45° to a bight portion 43 of the slide bar defining on its inner surface a pair of planar intersecting surfaces 44 and 45 intersecting at an angle of 135° and defining additional clamping surfaces of the octangular array defined by the clamping surface 40. The legs 41 and 42 slidably fit in the slots 38 of the confronting first and second slide members 34 and 35, and thus, upon relative displacement between the first and second slide members, the bight portion 43 of the slide member 36 is caused to move perpendicularly to the line of movement between the first and second slide members. As the legs 41 and 42 extend at 45° angles, the movement of bight portion 43, and therefore clamp surfaces 44 and 45, correspond exactly to the movement of the clamping surfaces 40 relative to each other so as to maintain an octangular array of the clamping surfaces while permitting an infinite adjustment of the cross-sectional size thereof.

To effect such relative movement between the slide members 34 and 35, the slide members 35 are fixedly secured between the top and bottom plates 22 and 23 by a plurality of roll pins 46 which are press-fitted into a pair of the holes 37 and a rivet 47 extending through the outermost holes 37 of the slide members 35. Thus, rivet 47 cooperates with block 24 in locking the top and bottom plates 22 and 23 with the interfitted slide members 21 therebetween.

Figure 7:
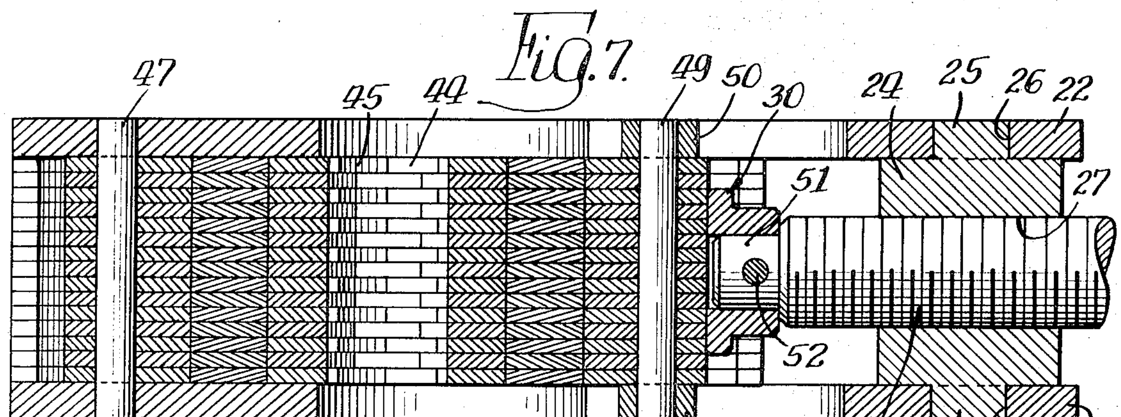
FIG. 7 is a longitudinal vertical section taken substantially along the line 7—7 of FIG. 5.
Figure 8:
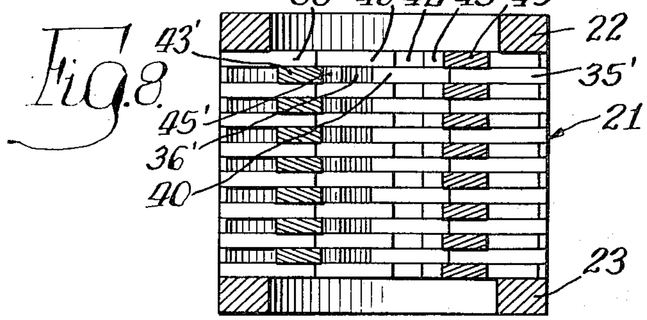
FIG. 8 is a transverse vertical section taken substantially along the line 8—8 of FIG. 5.

The slide members 34 are movable longitudinally of the clamp by the engagement of connector 30 with the slide members 34 in the undercut slots 31 as a result of the threaded movement of the rod 28. The slide members 34 are secured together as a unit by roll pins 48 and an elongated roll pin 49 provided at its opposite ends with guide caps 50 slidably received in slots 33 of the top and bottom plates. As best shown in FIG. 7, rod 28 is provided at its inner end with a reduced diameter portion 51. Connector 30 is pinned to rod portion 51 by a suitable roll pin 52 and, thus, force is transmitted from the threaded rod 28 through the connector 30 to the stack of slide members 34 to move the stack of slide members alternatively toward or away from the fixed slide members 35 as desired. As discussed above, such movement changes the size of the octangular array of clamping surfaces 40, 44, and 45 so as to cause the clamping surfaces to engage a workpiece such as tube 11 at four spaced points, as illustrated in FIGS. 5 and 6, for an infinite range of tube sizes.

Referring again to FIG. 9, the adjacent set of slide members 34', 35' and 36' is, as indicated above, identical to the set 34, 35 and 36 but is reversed so that the legs 41' and 42' of the third slide member 36' extend oppositely to legs 41 and 42 of the first set. This reversed arrangement is alternatively effected throughout the stack of slide members defining the interfitted slide members assembly 21 and, thus, the tube 11 is alternatively engaged at four spaced points by adjacent sets of slide members intermediate the location of the spaced points engaged by the first set 34, 35 and 36, i.e., the engagement points of the second set are offset by an angle of 180° from the corresponding engagement portion of the first set. Therefore, the engagement of the interfitted slide member assembly 21 with the tube 11 is effectively at eight points around the circumference of the tube while at each layer, or level, defined by a set of first, second and third slide members, the tube is engaged at only four points.

Thus, to clamp a tube 11 in association with the flaring tool 12, the tube need merely be inserted into the clamping space 53 about which the clamping surfaces 40, 44 and 45 are arranged in the octangular array and the handle 13 suitably manipulated to thread the rod through the block 24 to urge the movable set of first slide members 34 toward the fixed set of slide members 35. The legs 41 and 42 of the third slide members 36 are caused to slide further into the slots 38 of the first and second slide members as a result of the movement of the first slide members 34 along the longitudinal axis line of movement thereof, thereby maintaining the octangular array of clamping surfaces while reducing the cross-sectional size thereof until each of the clamping surfaces 40, 44 and 45 engages the outer circumference of the tube. Further turning of the handle forcibly tightens the clamp to hold the tube firmly against the flaring action of the cone 14. As the clamp is infinitely adjustable, any diameter tube may be so clamped therein to be flared by the flaring cone, thereby permitting the flaring of an infinite range of sizes of tubes including both English size tubes, metric size tubes, etc.

While the invention has been described in connection with the holding of a tubular workpiece 11, as will be obvious to those skilled in the art, any suitable workpiece may be held by the clamp where the cross-sectional configuration thereof may be suitably engaged by the effectively octangular array of clamping surfaces. Thus, illustratively, the tool may be used to engage an octangularly headed bolt as the clamping surfaces will accommodate themselves accurately to the periphery thereof so that the tool, for example, could be used as a universal infinitely adjustable wrench.

The tool is extremely simple and economical of construction. Thus, the top and bottom plates are of identical construction and each of the first and second slide members is of identical construction. The different interfitted layers of slide members are obtained by the use therefor of only two different elements, namely, a slide member such as slide member 34 shown in FIG. 9 and a slide member such as slide member 36 of FIG. 9. The clamp is relatively small in size, thus facilitating the use thereof in tools such as flaring tools, while yet providing a positive firm grip of the workpiece suitable to effectively hold the workpiece during the working operation. The clamp is extremely economical of construction and by virtue of the universal adaptability thereof, may be used with a wide range of workpieces heretofore requiring a plurality of different clamp devices.

As shown in FIG. 10, a modified form of clamp generally designated 110 is similar to tool 10 but provided with first and second slide members having clamping surfaces 140 extending at an angle of 60° to the line of movement 139. The third slide clamping surface 144 extends parallel to the line of movement 139 so as to cooperate with clamping surfaces 140 in defining a hexagonal array wherein each set of first, second, and third slide members defines means for engaging the tube 11 at three equiangularly spaced points. Thus, the alternating sets of slide members effectively engage the tube in a hexagonal array at six positions spaced 60° apart about the axis of the tube. Further illustratively, the clamp 110 is adapted for engaging a hexagonal object, such as hex bolts, etc., having an infinite range of sizes and thus is adapted for use as a wrench in connection therewith.

Referring to FIG. 11, a further modified form of tool generally designated 210 is shown to comprise a clamp similar to clamp 10 but wherein the slide members 234 and 235 define clamping surfaces 240 extending perpendicularly to the line of movement 239 between the first and second slide members. The slide member 236 defines a flat clamping surface 244 extending parallel to the line of movement 239 and thus a square array of clamping surfaces is provided about the clamping space 253 for engaging the tubular workpiece at three spaced points with each set of first, second, and third slide members. The adjacent sets of slide members provide an additional engagement opposite the engagement by clamping surface 244 so as to effectively define a clamping means engaging the tube at four 90° spaced points about the circumference thereof.

The provision of the double set of contact points by the successive sets of slide members is illustrated in FIGS. 12, 13, and 14 for each of tools 10, 110 and 210. In these figures, the subjacent set of slide members is shown shaded. Thus, the provision of the interspersed contact points by the two successive sets is clearly illustrated in these figures.

Referring now to FIGS. 15 and 16, a further modified form of clamp generally designated 310 is shown to comprise a clamp similar to clamp 10 except that the engagement between the threaded rod 328 and the assembled interfitted slide members 321 is separable. Thus, as best seen in FIG. 6, the inner end 329 of the threaded member 328 defines a flat surface which bears against the confronting flat face 354 of the assembled interfitted slide members 321 when the threaded rod is advanced thereagainst, as shown in dotted lines in FIG. 15. As shown in full lines in FIG. 16, the threaded rod 328 may be retracted from the face 354 of the assembled interfitted slide members 321 permitting the movable slide members to be retracted as desired by the user. In all other respects, clamp 310 is similar to clamp 10 and functions in a similar manner.

Referring now to FIGS. 17–19, a further modified clamp generally designated 410 is shown to comprise a clamp similar to clamp 10 but having a force limiting connector generally designated 455 for releaseably connecting the handle 413 to the threaded rod 428 so as to limit the amount of force exertable by the user in clamping the workpiece. As shown, connector 455 includes a collar 456 fixed to the handle 413 as by suitable roll pin 457. The threaded rod 428 includes a fixed flange 458 thereon and a disc spring 459 is disposed between fixed flange 458 and handle collar 456 to bias the collar axially outwardly relative to the threaded rod 428, or to the right, as seen in FIG. 17.

A collar 460 is connected to the distal end 461 of rod 428 by suitable roll pin 462. Collars 456 and 460 are provided with interengaging ratchet teeth 463 which permit transfer of rotational forces from collar 456 to collar 460 to advance the threaded rod 428 and thereby effect a clamping of the workpiece. The teeth define inclined leading portions 464 so that as the resistance to the clamp force builds up in the workpiece, the handle collar 456 is urged away from the shaft collar 460 against the action of the biasing spring 459 until, at a preselected maximum torque, the ratchet teeth 463 become disengaged thereby preventing further application of clamping force to the workpiece.

Reverse rotation of the handle 413 at this time causes engagement of longitudinally extending faces 465 of the ratchet teeth 463 thereby positively withdrawing the rod 428 and releasing the workpiece. Thus, in effect, the connector 455 comprises a torque limiting clutch effectively precluding overstressing of the workpiece in the clamp 410. As will be obvious to those skilled in the art, the ratcheting connector may be utilized with any of the preceding forms of clamps including clamps 10, 110, 210 and 310. Other forms of torque limiting connectors may be employed within the scope of the invention as will also be obvious to those skilled in the art.

Turning now to the embodiment of FIGS. 20–25, a further modified form of clamp embodying the invention, generally designated 510, is shown to comprise an adjustable chuck. Chuck 510 is generally similar to clamp 10 but provides a means for effecting a maintained center of the workpiece for the adjusted positions of the slide members so as to adapt the chuck for use in holding workpieces such as in lathes and the like.

More specifically, chuck 510 includes a body 566 having an internally threaded connecting portion 567 and an upper support portion 568. A cover 569 is secured in overlying relationship to the support portion 568 by suitable cap screws 570. Cover 569 defines a downwardly opening slot 571 extending from one edge 572 inwardly to the center of the cover. Support portion 568 defines a corresponding upwardly opening slot 573 extending from an opposite edge portion 574 of the support portion inwardly to the center of the support. Cover 569 further defines a downwardly opening transverse slot 575 and support portion 568 further defines a corresponding upwardly opening transverse slot 576.

Figures 20, 21, 22, 23, 24, 25:
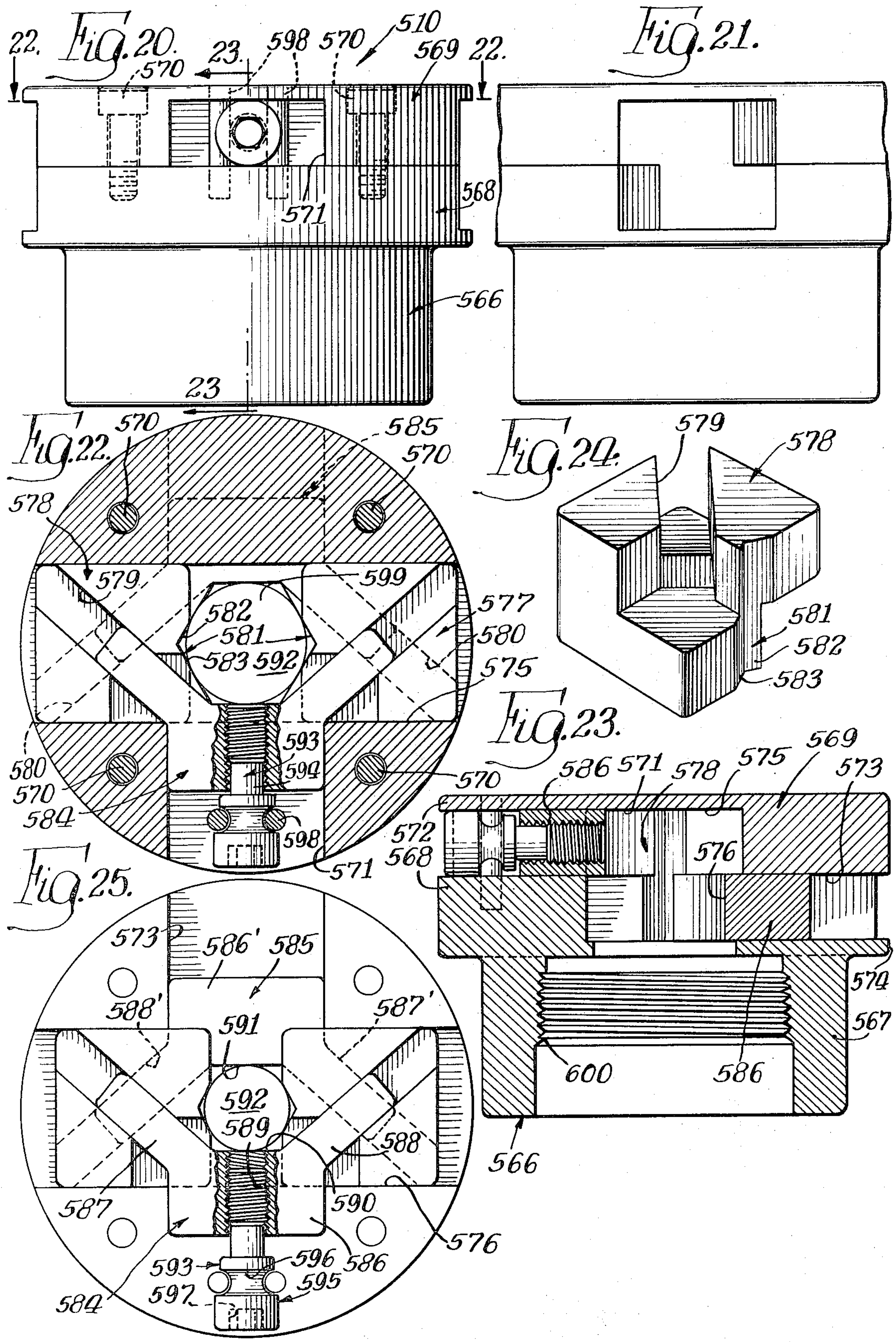
FIG. 20 is a side elevation of a chuck form of adjustable clamp embodying the invention.
FIG. 21 is a fragmentary side elevation thereof.
FIG. 22 is a transverse section taken substantially along the line 22—22 of FIG. 20.
FIG. 23 is a vertical diametric section taken substantially along the line 23—23 of FIG. 20.
FIG. 24 is a diametric view of a slide member thereof.
FIG. 25 is a top plan view of the chuck.

A first slide member 577 and a second slide member 578 are slidably received in the confronting transverse slots 575 and 576. First and second slide members 577 and 578 are reversely identical. As shown in FIG. 24, each slide member defines a first, upwardly opening substantially rectilinear slot 579 extending at an angle cornerwise of the slide member. The slide member further defines a downwardly opening substantially rectilinear slot 580 extending angularly to slot 579 subjacent thereto and, thus, at a reverse angle cornerwise of the slide member. Further, each slide member includes a clamping surface portion 581 defined by a pair of intersecting flat surfaces 582 and 583 which, in the illustrated embodiment, intersect at an angle of approximately 120°. The angle of each of said slots 579 and 580 to the centerline of the slide member bisecting the angularly related surfaces 582 and 583 is perferably approximately 40°53′35″.

Chuck 510 further includes a third slide member generally designated 584 and a similar fourth slide member 585 which are reversely identical. Each of slide members 584 and 585 includes a slide portion 586 and a pair of divergent leg portions 587 and 588 extending at an angle of approximately 40°53′35″ to a central threaded bore 589 of the slide portion 586. Thus, as shown in FIGS. 22 and 25, the leg portions 587 and 588 of the upper slide member 584 are received in the upwardly opening slots 579 of the first and second slide members 577 and 578, and the legs 587′ and 588′ of the fourth slide member 585 are received in the downwardly opening slots 580 of the first and second slide members 577 and 578. The slide portion 586 of the third slide member 584 is slidably received in the slot 571 of the cover 569 and the slide portion 586′ of the fourth slide member 585 is slidably received in the slot 573 of the body support portion 568. Third slide member 584 further defines a third clamping surface 590 and fourth slide member 585 defines a fourth clamping surface 591 which cooperate with clamp surfaces 581 to define a hexagonal array about a clamping surface 592 at the center of the chuck. As indicated above, each of the slide members is slidably received in its corresponding slot and adjustment of the position of the slide members in the slots provides an infinitely adjustable positioning of the clamping surfaces for universal accommodation thereof to different size workpieces.

More specifically, the adjustment of the position of the slide members in the slots is effected herein by means of a screw member 593 having a threaded portion 594 received in threaded bore 589 of third slide member 584. The screw member 593 further includes a head portion 595 defining an annular, outwardly opening groove 596 and an axially outwardly opening hexagonal recess 597. The head portion 595 is retained in cover 569 against axial movement while permitting free rotation thereof by means of a pair of pins 598 extending chordally into the groove 596 at diametrically opposite positions thereof with pins 598 being secured to cover 569 and body support portion 568 to extend across the slot 571, as shown in FIG. 20. Hexagonal recess 597 is adapted to receive a suitable hexagonal tool to effect desired rotation of the screw 593 and as a result of such rotation, effect axial movement of the slide portion 596 of the third slide member 584 longitudinally of slot 571. Such slidable movement of third slide member 584 causes a corresponding movement of first and second slide members 577 and 578 perpendicularly thereto in slots 575 and 576 as a result of the slidable engagement of third slide member leg portions 587 and 588 in the slots 579 of the first and second slide members. At the same time, the displacement of the first and second slide members transversely to the axis of the screw 593 causes a sliding movement of the fourth slide member 585 in slot 573 parallel to the axis of the screw 593. This is caused by the slidable engagement of the first and second slide member means defining the lower slots 580 against the legs 587' and 588' of the fourth slide member. Resultingly, each of the clamping surfaces 581 (including the intersecting surfaces 582 and 583), 590 and 591 is caused to maintain a similar spacing relative to the center of clamping surface 592 notwithstanding an infinitely adjustable variation in the cross-sectional size of the hexagonal array defined by the clamping surfaces. Thus, different size workpieces such as hexagonal workpiece 599, as shown in FIG. 22, may be quickly and effectively clamped in the clamping space 592 by engagement thereof by the clamping surfaces at six circumferentially spaced positions.

The workpiece may be released from the clamped condition by a simple reverse rotation of the screw member 493 whereby the third slide member is moved away from clamping space 592 and concurrently causes a reverse movement of first slide member 577, second slide member 578, and fourth slide member 585. As will be obvious to those skilled in the art, the modified structures of the different above described clamp embodiments may be utilized in chuck 510 as desired. Thus, illustratively, the clamping surfaces 581 may comprise single flat surfaces to as to provide a four-point contact of the workpiece by the sliding surfaces as desired. Further illustratively, a torque limiting ratchet structure may be employed in the screw member 593 to limit the clamping force applied to the workpiece in the chuck as desired.

It should be noted that the construction of the chuck 510 is extremely simple and economical. The first and second slide members are reversely similar, and the third and fourth slide members are identical (except for bore 589 in slide member 584) although reversely installed. Thus, a minimum of different parts need be manufactured to form the chuck, facilitating assembly and minimizing cost. The chuck is extremely simple in operation and thus provides a long, trouble-free life while yet providing the highly desirable, infinitely adjustable clamping of the workpiece as discussed above. To further minimize cost, the chuck parts may be assembled prior to the provision of the final forming of the threaded bore 600 in the connecting portion 567. The assembled chuck may then be clamped onto a piece of hexagonal stock accurately centered in a lathe and the threaded bore then turned in the lathe.

Corresponding parts of the different embodiments are identified by similar reference numerals except 100 higher.

As will be obvious to those skilled in the art, the relative movement of the slide members may be effected by moving different ones of the slide members by the force applying means. Thus, illustratively, the invention comprehends such clamp means wherein the slide members defining the leg portions, such as slide members 43, comprise the elements moved by the force providing means so as to cause corresponding movement of the two spaceable slide members, such as slide members 34 and 35. Alternatively, in the self-centered arrangement, the slide members engageable by the force transmitting means may comprise one of the slide blocks 577 or 578. Further alternatively, the self-centering arrangement may be utilized without the fourth slide member 585 within the broad scope of the invention. The foregoing disclosure of specific embodiments is illustrative of the broad inventive concepts comprehended by the invention.

I claim:

1. An adjustable clamp comprising: means defining a fixed first clamping surface; means defining a second clamping surface; means defining a third clamping surface; and means for variably positioning said clamping surfaces means to dispose said clamping surfaces in any one of a plurality of polygonal arrays about a clamping space, including means for adjustably positioning said second clamping surface means relative to said first surface means to have variable spacing therebetween along a rectilinear line of movement, and said third surface means to have variable positioning laterally of said line of movement, and means responsive to the variable positioning of said second clamping surface means relative to said first clamping surface means for correspondingly adjustably positioning said third clamping surface means to maintain said clamping surfaces in polygonal array notwithstanding a variation in the cross section size thereof whereby said clamping surfaces may engage and retain an object in said clamping space.

2. The adjustable clamp of claim 1 wherein said first and second clamping surfaces extend at equal but opposite angles to said line of movement.

3. The adjustable clamp of claim 1 further including means for limiting the force exertable by said slide members against the object to be clamped.

4. The adjustable clamp of claim 1 wherein each of said arrays of clamping surfaces comprises a discontinuous array.

5. The adjustable clamp of claim 4 wherein said arrays are regularly polygonal.

6. An adjustable clamp comprising: means defining a fixed first clamping surface; means defining a second clamping surface; means defining a third clamping surface; means for positioning said clamping surfaces means to dispose said clamping surfaces in a polygonal array about a clamping space; means for variably spacing said first and second surfaces means along a rectilinear line of movement and means responsive to a variable spacing of said first and second clamping surfaces means for correspondingly adjustably positioning said third clamping surface means to maintain said clamping surfaces in said polygonal array notwithstanding a variation in the cross section size thereof whereby said clamping surfaces may engage and retain an object in said clamping space.

7. The adjustable clamp of claim 6 wherein said array comprises a regular polygonal array.

8. An adjustable clamp for clamping any one of a plurality of objects having different cross sections comprising:

- a first slide member having a first, substantially rectilinear slot;
- a second slide member having a second, substantially rectilinear slot substantially coplanar with said first slot;
- a third slide member having a first slide portion slidably received in said first slot, a second slide portion slidably received in said second slot, and a clamping portion between said slide portions, said first, second and third slide members defining an assembly;
- means for mounting said first and second members for variable spacing therebetween along a preselected rectilinear line of movement with said slots extending toward each other at equal and opposite acute angles to said line of movement, and mounting said third member for variable postioning thereof to have said clamping portion of said third slide member variably positioned in a direction perpendicular to said line of movement of said first and second members; and means for effecting said variable spacing and positioning as a result of movement of one of said slide members, said first and second slide members further defining clamping surfaces adjacent said third slide member clamping portion and defining therewith an adjustable size peripheral array of clamping surfaces facing inwardly toward a clamping space in which the object to be clamped is received for peripheral clamping engagement by said clamping surfaces.

9. The adjustable clamp of claim 8 wherein a second assembly of such first, second, and third slide members is provided adjacent said first named assembly, the slots of said first and second slide members and the slide portions of said third slide member of said second assembly extending parallel to the slots and slide portions of said first assembly oppositely to said line of movement whereby a cylindrical object extending through said clamping space axially perpendicularly to the plane of said slots is engaged at a first plurality of circumferential positions by said first assembly and a second, different plurality of circumferential positions by said second assembly.

10. The adjustable clamp of claim 8 wherein said means for effecting said variable spacing comprises manually operable means.

11. The adjustable clamp of claim 8 wherein said clamping portion of said third slide member defines a rectilinear clamping surface facing said clamping space and extending parallel to said line of movement.

12. The adjustable clamp of claim 8 wherein said array is polygonal.

13. The adjustable clamp of claim 8 wherein said means for effecting said variable spacing and positioning of said slide members comprises means operable in one direction of operation to urge said one slide member toward said space and operable in an opposite direction of operation to release said one slide member and permit movement of said one slide member away from said space.

14. The adjustable clamp of claim 8 wherein said means for effecting said variable spacing and positioning of said slide members is connected to said one slide member to cause variable positioning of said one slide member as an incident of operation thereof.

15. The adjustable clamp of claim 8 wherein said means for effecting said variable spacing and positioning of said slide members comprises screw means.

16. An adjustable clamp for clamping any one of a plurality of objects having different cross sections comprising:

a first slide member having a first, substantially rectilinear slot;

a second slide member having a second, substantially rectilinear slot substantially coplanar with said first slot;

a third slide member having a first slide portion slidably received in said first slot, a second slide portion slidably received in said second slot, and a clamping portion between said slide portions;

means for mounting said first and second members for variable spacing therebetween along a preselected rectilinear line of movement with said slots extending toward each other at equal and opposite acute angles to said line of movement, said clamping portion of said third slide member being variably positioned in a direction perpendicular to said line of movement as a result of said variable spacing of said first and second slide members, said first and second slide members further defining clamping surfaces adjacent said third slide member clamping portion and defining therewith an adjustable size polygonal array of clamping surfaces facing inwardly toward a clamping space in which the object to be clamped is received for peripheral clamping engagement by said clamping surfaces; and means for forcibly effecting relative movement of said first and second slide members toward each other along said line of movement.

17. The adjustable clamp of claim 16 further including means for fixing said first slide member at one side of said clamping space, and means for adjustably positioning said second slide member along said line of movement to adjust the cross section of said clamping space to accommodate different size cylindrical objects to be clamped therein.

18. The adjustable clamp of claim 16 wherein a second assembly of such first, second, and third slide members is provided adjacent said first assembly, the slots of said first and second slide members and the slide portions of said third slide member of said second assembly extending parallel to the slots and slide portions of said first assembly oppositely to said line of movement whereby a cylindrical object extending through said clamping space axially perpendicularly to the plane of said slots is engaged at a first plurality of circumferential positions by said first assembly and a second, different plurality of circumferential positions by said second assembly, and further including means for fixing each of said first slide members at one side of said clamping space, and means for adjustably positioning each of said second slide members along said line of movement to adjust the cross section of said clamping space to accommodate different size cylindrical objects to be clamped therein.

19. The adjustable clamp of claim 16 wherein said third slide member is generally V-shaped with said clamping portion defining the apex of the V-shape.

20. The adjustable clamp of claim 16 further including means for fixing said first slide member at one side of said clamping space, and means for adjustably positioning said second slide member along said line of movement to adjust the cross section of said clamping space to accommodate different size cylindrical objects to be clamped therein, said positioning means including a guide in fixed spaced relationship to said first slide member, and means on said second slide member slidably engaging said guide.

21. The adjustable clamp of claim 16 wherein said means for forcibly effecting relative movement between said first and second slide members comprises means for guiding said second slide member along said line of movement, and means releasably abutting a surface of said second slide member facing away from said first slide member and adjustably advanceable toward and away from said first slide member parallel to said line of movement.

22. The adjustable clamp of claim 16 wherein said means for forcibly effecting relative movement between said first and second slide members comprises threaded rod means threaded to a female portion fixedly associated with said first slide member.

23. The adjustable clamp of claim 16 wherein said means for effecting relative movement of said slide members includes means for limiting the clamping force applied to said object in said clamping space.

24. The adjustable clamp of claim 16 wherein said first slide member is provided with a connecting portion and said means for effecting relative movement of said slide members comprises a force member having a connecting portion movably connected to said first slide member connecting portion.

25. The adjustable clamp of claim 24 wherein said connecting portion of said first slide member comprises a socket and said force member connecting portion comprises a male element rotatably received in said socket.

26. An adjustable gripping device comprising a stacked assembly of parallel, flat interleaved elements each arrangement of elements including: a first gripping means providing a polygonal array of substantially planar first gripping surfaces disposed about a centerline; a second gripping means providing a similar polygonal array of substantially planar second gripping surfaces disposed about said centerline coaxially adjacent said first array but offset from said first array 180° about said centerline; and means for adjustably moving said gripping surfaces selectively toward said centerline whereby a cylindrical object coaxial to said centerline within said arrays is engaged concurrently by said first and second gripping means at a number of positions about the centerline equal to the number of sides of the polygonal array.

27. The adjustable gripping device of claim 26 wherein a pair of said gripping surfaces is defined by a recess portion of a gripping element.

28. The adjustable gripping device of claim 26 wherein each of said first and second gripping means comprises a plurality of slidably interfitted elements.

29. The adjustable gripping device of claim 26 wherein a plurality of said first and second gripping means is provided about said centerline.

30. The adjustable gripping device of claim 26 including means for limiting the force exertable by said moving means for limiting the force of engagement of the object by the gripping means.

31. The adjustable gripping device of claim 26 wherein said moving means includes a handle for manual operation thereof and said device further includes means for limiting the force exertable by said handle means for limiting the force of engagement of the object by the gripping means.

32. The adjustable gripping device of claim 26 wherein said moving means includes a handle for manual operation thereof and said device further includes spring biased ratchet means for limiting the force exertable by said handle means for limiting the force of engagement of the object by the gripping means.

33. An adjustable clamp comprising: means defining first, second and third clamping surfaces; means for positioning said clamping surfaces means to dispose said clamping surfaces in a polygonal array about a clamping space; means for variably positioning one of said surface means relative to said space; means responsive to variable positioning of said one surface means for correspondingly adjustably positioning at least one of the other surface means to maintain said clamping surfaces in said polygonal array notwithstanding a variation in the cross section size thereof whereby said clamping surfaces may engage and retain an object in said clamping space; and yieldable means for limiting the force exertable by said means for effecting relative movement of said slide members for limiting the force of engagement thereof against the object to be clamped, said means for effecting relative movement of said slide members comprising a screw member having one end engaging one of said slide members and means for fixing the other slide member and said force limiting means comprising a clutch for rotating said screw member from a driver means, said clutch comprising a ratchet and a disc spring biasing said ratchet to a yieldable driving position, said ratchet being unidirectional for providing positive retraction of said screw member.

34. An adjustable clamp for clamping any one of a plurality of objects having different cross sections coaxially of a centerline of the clamp, comprising:

a first slide member having a first, substantially rectilinear slot;

a second slide member having a second, substantially rectilinear slot;

a third slide member having a first slide portion slidably received in said first slot, a second slide portion slidably received in said third slot, and a clamping portion between said first and second slide portions;

means for mounting said first and second members for variable spacing therebetween along a preselected rectilinear line of movement with said slots extending toward each other at equal and opposite acute angles to said line of movement, said clamping portion of said third slide member being variably positionable in a direction perpendicular to said line of movement, said first and second slide members further defining clamping surfaces adjacent said third slide member clamping portion and defining therewith a peripheral polygonal array of clamping surfaces facing inwardly toward a clamping space in which the object to be clamped is received for peripheral clamping engagement by said clamping surfaces; and adjustable means for forcibly effecting movement of one of said slide members and thereby move each of said slide members correspondingly toward each other for engaging the object to be clamped therebetween whereby said array of clamping surfaces is adjustable in cross section and maintained concentric with the center of said space.

35. The adjustable clamp of claim 34 wherein said adjustable means comprises means for moving said third slide member.

36. The adjustable clamp of claim 34 wherein said adjustable means comprises threaded means rotatably, axially fixedly carried by said mounting means and threaded to said one slide member.

37. The adjustable clamp of claim 34 wherein said adjustable means comprises manually adjustable means.

38. The adjustable clamp of claim 34 wherein each of said first and second slide members clamping surfaces is flat.

39. The adjustable clamp of claim 34 wherein said clamping portion of each of said first and second slide members comprises a pair of angularly intersecting flat surfaces defining a recess facing said clamping space.

40. The adjustable clamp of claim 34 wherein said clamping portion of each of said first and second slide members comprises a pair of angularly intersecting flat surfaces defining a recess facing said clamping space, and said polygonal array comprises a hexagonal array with said intersecting surfaces defining a corner of said array and said clamping portion of said third slide member defining a side of said array.

41. The adjustable clamp of claim 34 wherein said adjustable means comprises means for forcibly effecting movement of said third slide member to move said first and second slide members toward each other along said line of movement for engaging the object to be clamped therebetween, whereby said array of clamping surfaces is adjustable in cross section and concentric with the center of said space.

42. An adjustable chuck comprising: means defining a first pair of clamping surfaces; means defining a second pair of clamping surfaces; means for variably spacing said first clamping surfaces means; and means responsive to a variable spacing of said first clamping surfaces means for correspondingly variably spacing said second clamping surfaces to maintain said surfaces in a polygonal array about a fixed centerline extending through a clamping space whereby said surfaces may engage and retain an object in said space, said means for variably spacing said clamping surfaces comprising means for slidably interconnecting said clamping surfaces means.

43. The adjustable chuck of claim 42 wherein means are provided for guiding said clamping surfaces means pairs in mutually perpendicular intersecting paths.

44. The adjustable chuck of claim 42 including manually operable means for operating said means for variably spacing said first clamping surfaces means.

45. An adjustable clamp for clamping any one of a plurality of objects having different cross sections coaxially of a centerline of the clamp, comprising:

a first slide member having a first, substantially rectilinear slot and a second, substantially rectilinear slot extending angularly to said first slot;

a second slide member having a third, substantially rectilinear slot substantially coplanar with said first slot and a fourth, substantially rectilinear slot substantially coplanar with said second slot;

a third slide member having a first slide portion slidably received in said first slot, a second slide portion slidably received in said third slot, and a clamping portion between said first and second slide portions;

a fourth slide member having a third slide portion slidably received in said second slot of said first slide member, a fourth slide portion slidably received in said fourth slot of said second slide member, and a clamping portion between said third and fourth slide portions;

means for mounting said first and second members for variable spacing therebetween along a preselected line of movement with said slots extending toward each other at equal and opposite acute angles to said line of movement, said clamping portion of said third slide member being variably positionable in a direction perpendicular to said line of movement, said first and second slide members further defining clamping surfaces adjacent said third slide member clamping portion and defining therewith a peripheral polygonal array of clamping surfaces facing inwardly toward a clamping space in which the object to be clamped is received for peripheral clamping engagement by said clamping surfaces, said fourth slide member being variably positioned in a direction perpendicular to said line of movement by said first and second slide members as a result of said variable spacing thereof, said fourth slide member clamping portion facing inwardly toward said clamping space for engaging said object; and adjustable means for forcibly effecting movement of said third slide member to move said first and second slide members toward each other along said line of movement for engaging the object to be clamped therebetween, whereby said array of clamping surfaces is adjustable in cross section and concentric with the center of said space.

46. The adjustable clamp of claim 45 wherein said first and second slide members are reversely similar.

47. The adjustable clamp of claim 45 wherein said second and third slide members are similar.

48. The adjustable clamp of claim 1 wherein said clamping surfaces comprise planar surfaces.

49. The adjustable clamp of claim 6 wherein said clamping surfaces comprise planar surfaces.

50. The adjustable clamp of claim 8 wherein said clamping surfaces and clamping portion define planar clamping surfaces.

51. The adjustable clamp of claim 16 wherein said clamping surfaces and clamping portion define planar clamping surfaces.

52. The adjustable gripping device of claim 26 wherein said gripping surfaces comprise planar surfaces.

53. The adjustable clamp of claim 33 wherein said clamping surfaces comprise planar surfaces.

54. The adjustable clamp of claim 34 wherein said clamping surfaces and clamping portion define planar clamping surfaces.

55. The adjustable chuck of claim 42 wherein said clamping surfaces comprise planar surfaces.

56. The adjustable clamp of claim 45 wherein said clamping surfaces and clamping portion define planar clamping surfaces.

57. An adjustable chuck comprising: means defining a first pair of clamping surfaces; means defining a second pair of clamping surfaces; means for variably spacing said first clamping surfaces means; and means responsive to a variable spacing of said first clamping surfaces means for correspondingly variably spacing said second clamping surfaces to maintain said surfaces in a polygonal array about a fixed centerline extending through a clamping space whereby said surfaces may engage and retain an object in said space, said means for variably spacing said clamping surfaces comprising means for directly slidably interconnecting said clamping surfaces means.

* * * * *